United States Patent
Fukawatase et al.

(10) Patent No.: US 7,997,610 B2
(45) Date of Patent: Aug. 16, 2011

(54) KNEE AIRBAG DEVICE

(75) Inventors: Osamu Fukawatase, Nishikamo-gun (JP); Kenji Imamura, Kosai (JP); Akiyoshi Sanada, Nishikamo-gun (JP); Kazuaki Bito, Nishikasugai-gun (JP); Yuichi Adachi, Nishikasugai-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 12/449,844

(22) PCT Filed: Feb. 28, 2008

(86) PCT No.: PCT/IB2008/000373
§ 371 (c)(1),
(2), (4) Date: Aug. 31, 2009

(87) PCT Pub. No.: WO2008/110880
PCT Pub. Date: Sep. 18, 2008

(65) Prior Publication Data
US 2010/0102539 A1   Apr. 29, 2010

(30) Foreign Application Priority Data
Mar. 9, 2007   (JP) .................................. 2007-060201

(51) Int. Cl.
*B60R 21/203* (2006.01)
*B60R 21/215* (2011.01)

(52) U.S. Cl. .................... 280/728.3; 280/731; 280/730.1
(58) Field of Classification Search .............. 280/728.3, 280/731, 730.1
See application file for complete search history.

(56) References Cited

U.S. PATENT DOCUMENTS

| 5,570,901 | A | 11/1996 | Fyrainer |
| 6,848,705 | B2 * | 2/2005 | Schneider et al. .......... 280/728.3 |
| 2003/0178819 | A1 * | 9/2003 | Schneider et al. .......... 280/728.3 |
| 2004/0207183 | A1 | 10/2004 | Nagata et al. |
| 2006/0071459 | A1 | 4/2006 | Hayakawa et al. |
| 2008/0122204 | A1 * | 5/2008 | Fukawatase et al. ....... 280/728.3 |
| 2008/0174091 | A1 * | 7/2008 | Hoshino et al. ............ 280/728.3 |

FOREIGN PATENT DOCUMENTS

| EP | 1 759 936 A1 | 8/2006 |
| JP | A-9-104317 | 4/1997 |
| JP | A-10-71911 | 3/1998 |
| JP | B2-2759065 | 3/1998 |
| JP | A-2001-106013 | 4/2001 |
| JP | A-2002-37003 | 2/2002 |

(Continued)

*Primary Examiner* — Ruth Ilan
*Assistant Examiner* — Keith Frisby
(74) *Attorney, Agent, or Firm* — Oliff & Berridge, PLC

(57) ABSTRACT

A knee airbag device includes an airbag module and an airbag door. The airbag module, which is provided inside a column cover that covers the rear end portion of a steering column, includes a gas generation device that generates gas when a collision occurs, and a knee airbag that is inflated and deployed from a folded state when the knee airbag receives the gas from the gas generation device. The airbag door, which is provided in the lower portion of the column cover, is opened when the inflation pressure of the knee airbag is equal to or higher than a predetermined value. When the knee airbag is deployed, at least a portion of the airbag door is positioned between an interfering object that is positioned in an area on the side of the column cover, and at least a portion of the knee airbag.

15 Claims, 6 Drawing Sheets

FOREIGN PATENT DOCUMENTS

| | | |
|---|---|---|
| JP | A-2004-210097 | 7/2004 |
| JP | A-2004-224259 | 8/2004 |
| JP | A-2004-284416 | 10/2004 |
| JP | A-2004-291733 | 10/2004 |
| JP | A-2004-291735 | 10/2004 |
| JP | A-2005-199765 | 7/2005 |
| JP | A-2005-199810 | 7/2005 |
| JP | A-2005-225463 | 8/2005 |
| JP | A-2006-36141 | 2/2006 |
| WO | WO 2007/132743 A1 | 11/2007 |

* cited by examiner

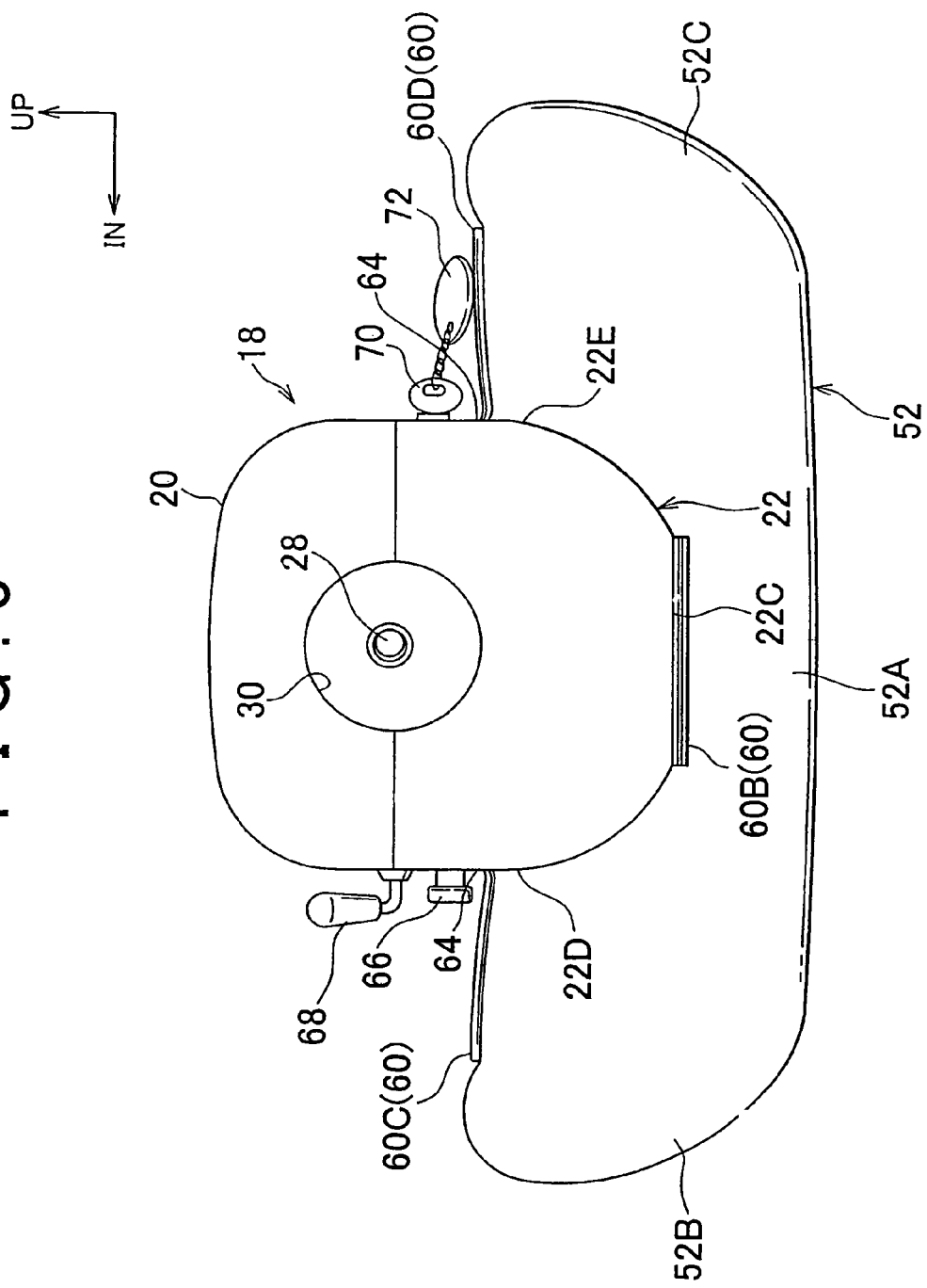

KNEE AIRBAG DEVICE

BACKGROUND OF THE INVENTION

1. Field of the Invention

The invention relates to a knee airbag device that includes a knee airbag that is inflated and deployed to restrain knees of an occupant when a collision occurs.

2. Description of the Related Art

Various knee airbag devices have been proposed to protect the knees of an occupant. For example, each of Japanese Patent No. 2759065 and Japanese Patent Application Publication No. 9-104317 (JP-A-9-104317) describes a knee airbag device in which an airbag module is disposed inside a column lower cover that covers the rear end portion of a steering column.

However, in the above-described technology, when the knee airbag is inflated and deployed, the knee airbag may contact a key accessory (a key chain or the like) and a manual tilt lever provided on the side of the column cover. Accordingly, the above-described knee airbag device needs to be improved in this regard.

Reinforcement cloth or the like may be provided in the portion of the knee airbag, which may interfere with the key accessory or the like, to reinforce the portion of the knee airbag. In this case, however, the number of components, and the number of man-hour required to assemble the knee airbag device are increased, and accordingly, the cost is increased.

SUMMARY OF THE INVENTION

The invention provides a knee airbag device in which a knee airbag is prevented from directly contacting an interfering object such as a key accessory or a tilt lever when the knee airbag is inflated and deployed, without the need of increasing the number of components.

A first aspect of the invention relates to a knee airbag device that includes an airbag module and an airbag door. The airbag module, which is provided inside a column cover that covers the rear end portion of a steering column, includes a generation device that generates gas when a collision occurs or when it is predicted that the collision will occur, and a knee airbag that is inflated and deployed from a folded state when the knee airbag receives the gas from the gas generation device. The airbag door, which is provided in the lower portion of the column cover, is opened when the inflation pressure of the knee airbag is equal to or higher than a predetermined value. When the knee airbag is deployed, at least a portion of the airbag door is positioned between an interfering object that is positioned in an area on the side of the column cover, and at least a portion of the knee airbag.

According to the first aspect, when a collision occurs or when it is predicted that the collision will occur, the gas generation device generates gas, and the knee airbag, which is stored in the folded state inside the column cover, is inflated by the gas. The airbag door is provided in the lower portion of the column cover. When the inflation pressure of the knee airbag is equal to or higher than the predetermined value, the airbag door is opened. As a result, the knee airbag is inflated and deployed, and thus, the knee airbag restrains knees of an occupant.

According to the above-described aspect, at least the portion of the airbag door is positioned between the interfering object that is positioned in the area on the side of the column cover, and at least the portion of the knee airbag that is inflated and deployed. That is, before the knee airbag is inflated and deployed, at least the portion of the airbag door is opened, and positioned between the interfering object and at least the portion of the knee airbag. This prevents at least the portion of the knee airbag from directly interfering with the interfering object.

In the knee airbag device according to the above-described aspect, the number of components is not increased, and thus, the cost is not increased.

As described above, in the knee airbag device according to the above-described aspect, it is possible to obtain the advantageous effect that when the knee airbag is inflated and deployed, the knee airbag is prevented from directly contacting the interfering objects such as the key accessory and the tilt lever, without the need of increasing the number of components.

In the knee airbag according to the above-described aspect, at least the portion of the airbag door may be formed in the side wall portion of the column cover; the axis of the hinge portion of the airbag door may be substantially parallel to the axis of the steering column; and the hinge portion may support at least the portion of the airbag door when the airbag door is opened.

The hinge portion may be formed in the side wall portion of the column cover at a position below the interfering object; and at least the portion of the airbag door may pivot around the hinge portion toward the top of a vehicle.

According to the above-described aspect, the hinge portion is formed in the side wall portion of the column cover at a position below the interfering object. Also, the axis of the hinge portion of the airbag door is substantially parallel to the axis of the steering column. The hinge portion supports at least the portion of the airbag door when the airbag door is opened. Therefore, the airbag door pivots toward the top of the vehicle around the axis (i.e., the hinge portion) that is substantially parallel to the axis of the steering column. As a result, the interfering object is positioned in the area on the side of the upper surface of the airbag door, and at least the portion of the knee airbag is positioned below the airbag door. Therefore, the interfering object does not directly contact at least the portion of the knee airbag.

In the knee airbag device according to the above-described aspect, it is possible to obtain the advantageous effect that when the knee airbag is inflated and deployed, the knee airbag is reliably prevented from directly contacting the interfering objects such as the key accessory and the tilt lever.

In the knee airbag device according to the first aspect, at least the portion of the airbag door may be formed in the side wall portion of the column cover; the axis of the hinge portion of the airbag door may be substantially perpendicular to the axis of the steering column in a lateral view; and the hinge portion may support at least the portion of the airbag door when the airbag door is opened.

The hinge portion may be formed in the side wall portion of the column cover at a position ahead of the interfering object; and at least the portion of the airbag door may pivot around the hinge portion toward the rear of a vehicle. The hinge portion may be formed in the side wall portion of the column cover at a position behind the interfering object; and at least the portion of the airbag door may pivot around the hinge portion toward the front of a vehicle.

According to the above-described aspect, at least the portion of the airbag door is formed in the side wall portion of the column cover. The axis of the hinge portion of the airbag door is substantially perpendicular to the axis of the steering column in the lateral view. The hinge portion supports at least the portion of the airbag door when the airbag door is opened. Therefore, the airbag door pivots around the axis (i.e., the hinge portion) that is substantially perpendicular to the axis of the steering column, forward or rearward in the direction of the axis of the steering column (i.e., toward the front or rear of the vehicle). As a result, the interfering object is positioned in the area toward which the airbag door is opened, and at least the portion of the knee airbag is positioned in the area on the side of the airbag door. Therefore, the interfering object does not directly contact the knee airbag.

In the knee airbag device according to the above-described aspect, it is possible to obtain the advantageous effect that when the knee airbag is inflated and deployed, the knee airbag is reliably prevented from directly contacting the interfering objects such as the key accessory and the tilt lever.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a front view showing the knee airbag device shown in FIG. 1 that is operated, taken along a plane perpendicular to the axis of a steering column;

DETAILED DESCRIPTION OF EMBODIMENTS

Figure 1:
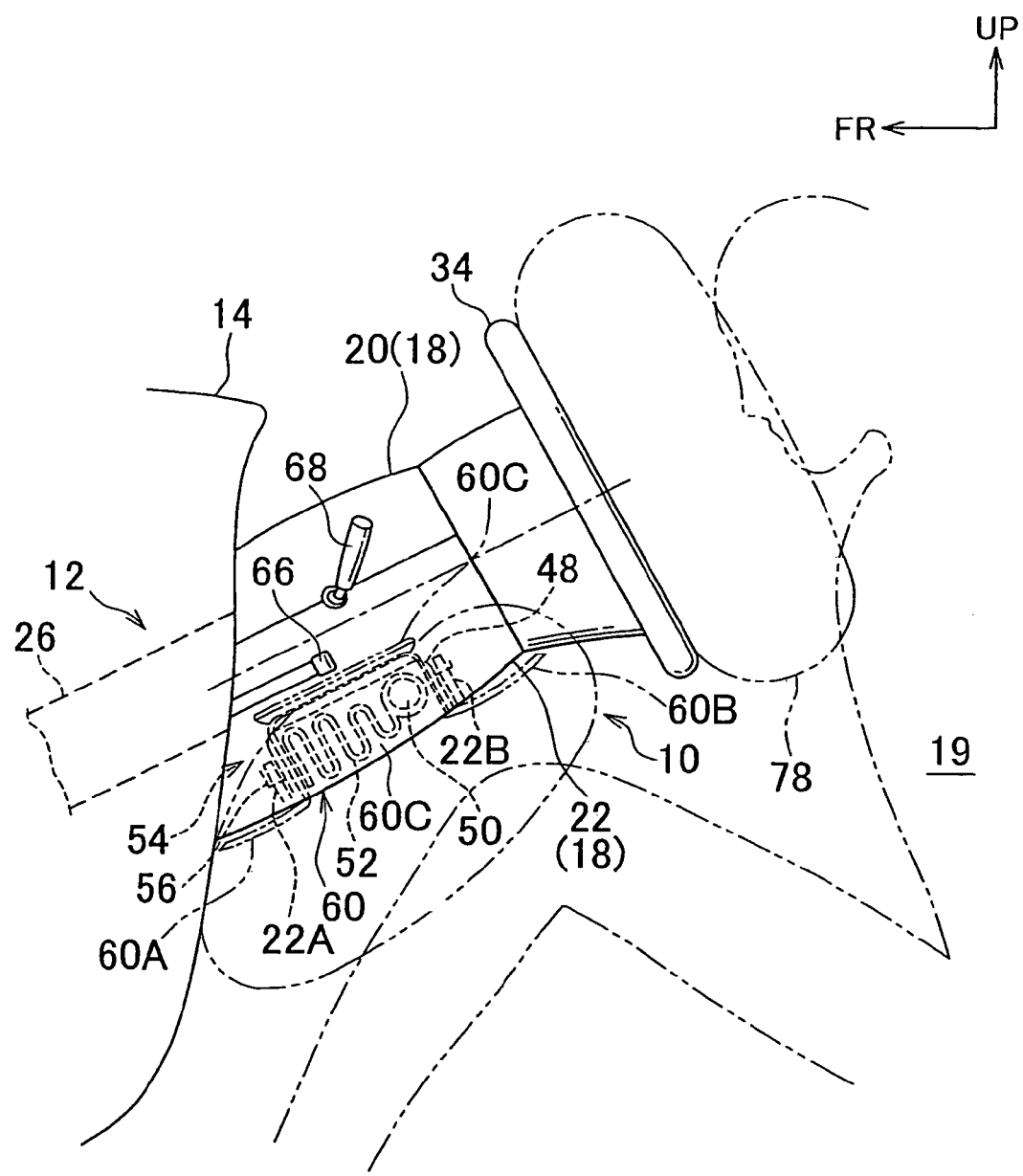
FIG. 1 is a lateral view showing the entire configuration of a knee airbag device according to an embodiment.
Figure 2:
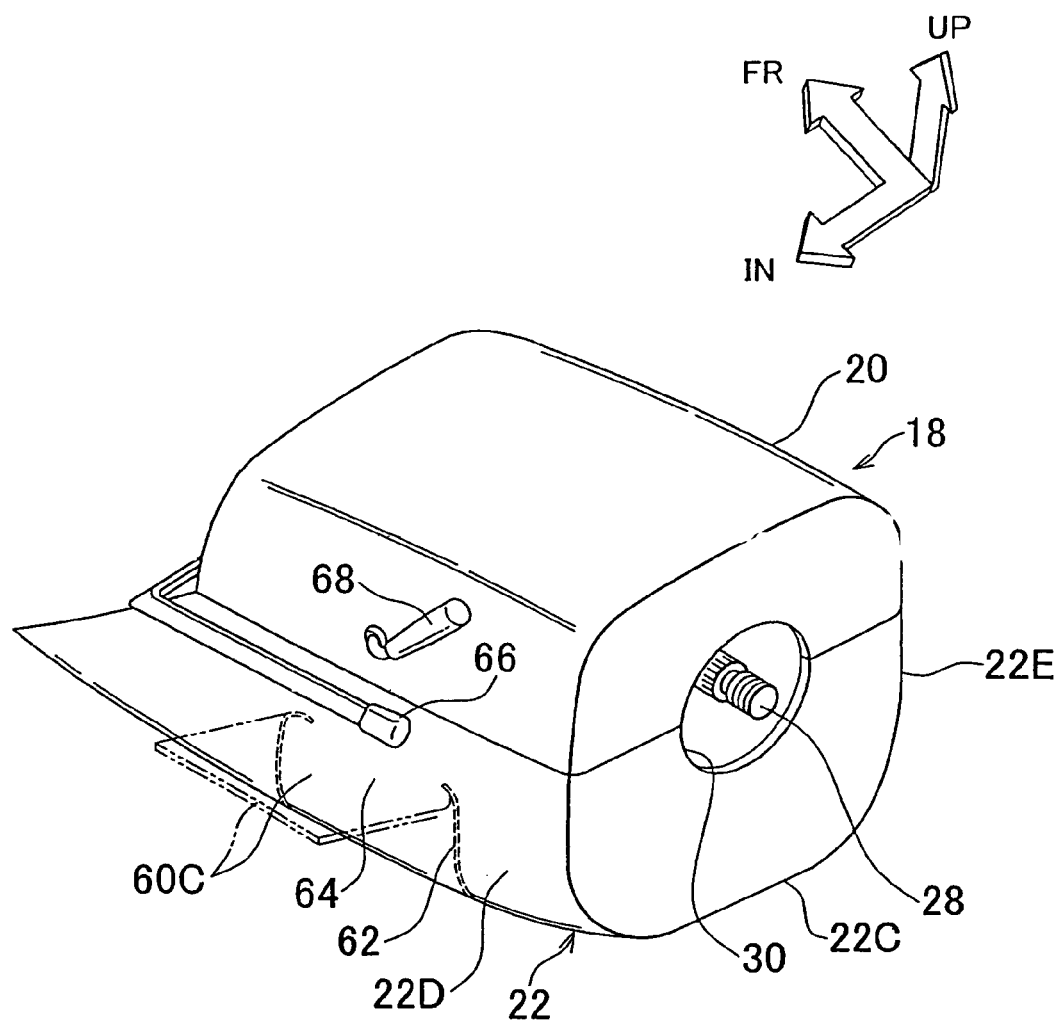
FIG. 2 is an enlarged perspective view showing a column cover shown in FIG. 1, which is the main portion of the embodiment.

Hereinafter, a knee airbag device according to an embodiment of the invention will be described with reference to FIG. 1 to FIG. 3. In FIG. 1 to FIG. 3, the arrow FR indicates the front of a vehicle. The arrow UP indicates the top of the vehicle. The arrow IN indicates the inside of a vehicle.

FIG. 1 is a lateral view showing the entire configuration of a knee airbag device 10 according to the embodiment of the invention. FIG. 2 is an enlarged perspective view showing the main portion of the knee airbag device 10. FIG. 3 is a front view showing the knee airbag device 10 that is operated, taken along a plane perpendicular to the axis of a steering column.

As shown in FIG. 1 to FIG. 3, an opening portion is formed in a portion of an instrument panel 14, which faces a driver seat. A steering column 12 is inserted through the opening portion such that the steering column 12 is inclined downward toward the front of the vehicle. The column cover 18 covers the rear end portion of the steering column 12, which protrudes toward a vehicle cabin 19 from the opening portion of the instrument panel 14. The column cover 18 is divided into two portions, i.e., an upper portion and a lower portion. More specifically, the column cover 18 includes a column upper cover 20 and a column lower cover 22. An opening 30 (refer to FIG. 2) is formed in the rear end portions of the column upper cover 20 and the column lower cover 22 at a center position. The rear end portion of a steering shaft 28 is inserted through the opening 30.

As shown in FIG. 1, the knee airbag device 10 includes an airbag module 54 and an airbag door 60. The airbag module 54 includes a module case 48, an inflator 50, and a knee airbag 52. The module case 48, which has a substantially box shape, is made of metal. The lower portion of the module case 48 is open. The inflator 50, which has a substantially cylindrical shape, is housed in the module case 48 at a rear end portion. The inflator 50 may be regarded as the gas generation device. The knee airbag 52 is stored in the folded state inside the module case 48 at a front end portion. The airbag door 60 covers the opening of the module case 48.

A stud bolt (not shown) stands on the inflator 50. The stud bolt is inserted through an attachment bracket fixed to the lower peripheral surface of the rear end portion of the column tube 26. Then, the stud bolt is fastened to the attachment bracket using a nut. Thus, the airbag module 54 is attached to the column tube 26. Brackets with various configurations may be employed as the attachment bracket. For example, a bracket that has a substantially M-shape in a view taken along a plane perpendicular to the axis of the steering column 12, or a bracket that has an L-shape in a view seen from the side of the steering column 12, may be employed.

In each of the front wall portion and the rear wall portion of the module case 48, a plurality of hook portions 56 are formed at predetermined intervals in a vehicle-width direction. The hook portions 56 are formed by bending the portions of the front wall portion and the rear wall portion. In this regard, a front wall portion 22A and a rear wall portion 22B are disposed on the inner surface of the column lower cover 22 at a predetermined interval in the direction of the axis of the steering column 12. The front wall portion 22A and the rear wall portion 22B stand toward the axis of the steering column 12. Engagement holes (not shown) are formed in each of the front wall portion 22A and the rear wall portion 22B. The hook portions 56 are engaged with the respective engagement holes. As a result, the airbag module 54 is located so that the open side of the module case 48 is covered.

Further, as shown in FIG. 3, the knee airbag 52 includes a center portion 52A and right and left side portions 52C and 52B. The center portion 52A is inflated and deployed below the column lower cover 22. The right and left side portions 52C and 52B are inflated and deployed in areas on the sides of the column lower cover 22.

Although the module case 48 made of metal is used in the embodiment, the module case 48 does not necessarily need to be made of metal. A module case made of cloth may be used. Alternatively, the inflator 50 and the knee airbag 52 may be simply covered with protective cloth, and no module case may be used. Further, although the knee airbag 52 is accordion-folded in FIG. 1, the knee airbag 52 does not necessarily need to be accordion-folded. A knee airbag that is rolled up, or a knee airbag that is accordion-folded and rolled up may be used.

The airbag door 60 is formed between the front wall portion 22A and the rear wall portion 22B that are provided in the column lower cover 22. When the column lower cover 22 is torn along a tear line 62 (tear portion) that is a thin portion, the airbag door 60 is opened forward, rearward, rightward, and leftward.

More specifically, the column lower cover 22 includes a bottom wall portion 22C, and a pair of right and left side wall portions 22E and 22D. The bottom wall portion 22C is disposed in substantially parallel with the axis of the steering column 12. The right and left side wall portions 22E and 22D stand at the side edges of the bottom wall portion 22C. The column lower cover 22 has a U-shape cross section. That is, the upper portion of the column lower cover 22 is open. The airbag door 60 is formed to extend in the bottom wall portion 22C, and in the right and left side wall portions 22E and 22D. The airbag door 60 includes a pair of a bottom front door 60A and a bottom rear door 60B, a right side door 60D, and a left side door 60C. The bottom front door 60A and the bottom rear door 60B are formed in the bottom wall portion 22C at a front portion and a rear portion, respectively. The right side door 60D and the left side door 60C are formed in the right and left side wall portions 22E and 22D, respectively. Each of the right side door 60D and the left side door 60C is not divided.

The right side door 60D and the left side door 60C pivot around the hinge portions 64 provided in the upper edges thereof so that end portions of the right side door 60D and the left side door 60C move from an area below the steering column 12 to areas on the sides of the steering column 12. That is, the right side door 60D and the left side door 60C are opened like wings. The hinge portions 64 are disposed in substantially parallel with the axis of the steering column 12. Accordingly, the tear line 62 extends in a U-shape for each of the right side door 60D and the left side door 60C in a lateral view. The bottom front door 60A and the bottom rear door 60B are opened forward and rearward, respectively, like double doors. Therefore, the tear line 62 extends in a substantially H-shape for the bottom front door 60A and the bottom rear door 60B in a bottom view. The airbag door 60 includes four doors, that is, two doors (right and left side doors) that are opened like wings, and two bottom front and rear doors. However, the invention is not limited to this configuration. The airbag door may be divided in various manners. For example, one bottom door may be provided, that is, the bottom door may not be divided into the bottom front door 60A and the bottom rear door 60B. In this case, the one bottom door is opened forward in the direction of the axis of the steering column 12.

As shown in FIG. 2, a tilt lever 66, which is regarded as an interfering object, is disposed above, and in substantially parallel with the hinge portion 64 of the left side door 60C in the column lower cover 22. An operation lever 68 for a combination switch projects from the left surface of the column upper cover 20. However, because the operation lever 68 is disposed on the side of the column upper cover 20, the operation lever 68 is disposed outside an area where the knee airbag 52 would be inflated and deployed if the airbag door 60 were not provided. Therefore, the operation lever 68 is not regarded as the interfering object.

As shown in FIG. 3, a key 70, which is inserted in a key insertion portion of a key cylinder, is positioned above the hinge portion 64 of the right side door 60D in the column lower cover 22. A key accessory 72, such as a key chain, is attached to the key 70. The key accessory 72 is regarded as an interfering object. The key accessory 72 is hung in the area on the side of the right side door 60D.

Advantageous Effects in the Embodiment

Next, advantageous effects obtained in the embodiment will be described.

When a frontal collision occurs (or when it is predicted that a frontal collision will occur), collision detection means (not shown) determines that a frontal collision occurs (or predicts that a frontal collision will occur), and outputs a signal to an airbag ECU. When the airbag ECU determines that airbag devices should be operated, a driver seat airbag device is operated to inflate a driver seat airbag 78 on the steering wheel 34, and the knee airbag device 10 is operated. That is, a predetermined current is supplied to the inflator 50 of the knee airbag device 10, and thus, the inflator 50 is operated. As a result, the inflator 50 generates gas, and the gas is supplied to the knee airbag 52 stored in the folded state, and thus the knee airbag 52 is inflated. When the inflation pressure of the knee airbag 52, which is applied to the column lower cover 22, reaches a predetermined value, the column lower cover 22 is torn along the tear line 62 formed in the column lower cover 22, and thus, the airbag door 60 is opened forward, rearward, rightward, and leftward. As a result, the center portion 52A and the right and left side portions 52C and 52B of the knee airbag 52 are inflated and deployed toward the area below the steering column 12 and the areas on the sides of the steering column 12, respectively. Thus, the right and left side portions 52C and 52B, which are disposed between the instrument panel 14 and the both knees of the occupant, receive and protect the knees of the occupant.

As described above, when the knee airbag 52 is inflated and deployed, the right and left side portions 52C and 52B of the knee airbag 52 may interfere with the interfering objects such as the key accessory 72 and the tilt lever 66, as shown in FIG. 1 and FIG. 3. However, in the embodiment, when the right side door 60D and the left side door 60C are opened, the axes of the hinge portions 64 are substantially parallel to the axis of the steering column 12. Therefore, the right side door 60D and the left side door 60C pivot toward the top of the vehicle around the axes (i.e., the hinge portions 64) that are substantially parallel to the axis of the steering column 12. As a result, the key accessory 72 and the tilt lever 66, which are regarded as the interfering objects, are positioned in areas on the side of the upper surfaces of the right side door 60D and the left side door 60C, respectively. Also, the right and left side portions 52C and 52B of the knee airbag 52 are positioned below the right side door 60D and the left side door 60C, respectively. Therefore, the key accessory 72 and the tilt lever 66 do not directly contact the right and left side portions 52C and 52B of the knee airbag 52, respectively. In other words, before the right and left side portions 52C and 52B of the knee airbag 52 are inflated and deployed, the right side door 60D and the left side door 60C pivot around the hinge portions 64 so that the right side door 60D and the left side door 60C are opened toward the areas on the right and left sides of the steering column 12, like wings. Thus, the right side door 60D is positioned between the key accessory 72 and the right side portion 52C of the knee airbag 52, and the left side door 60C is positioned between the tilt lever 66 and the left side portion 52B of the knee airbag 52. As a result, in the embodiment, it is possible to prevent the right and left side portions 52C and 52B of the knee airbag 52 from directly contacting the interfering objects such as the key accessory 72 and the tilt lever 66 when the knee airbag 52 is inflated and deployed.

This eliminates the need of taking a measure, for example, the need of providing reinforcement cloth on the upper surfaces of the right and left side portions 52C and 52B of the knee airbag 52. Therefore, it is possible to reduce the number of components, and the number of man-hours required to assemble the knee airbag device. Accordingly, the cost is reduced.

MODIFIED EXAMPLE

Next, modified examples will be described.

First Modified Example

Figure 4A:
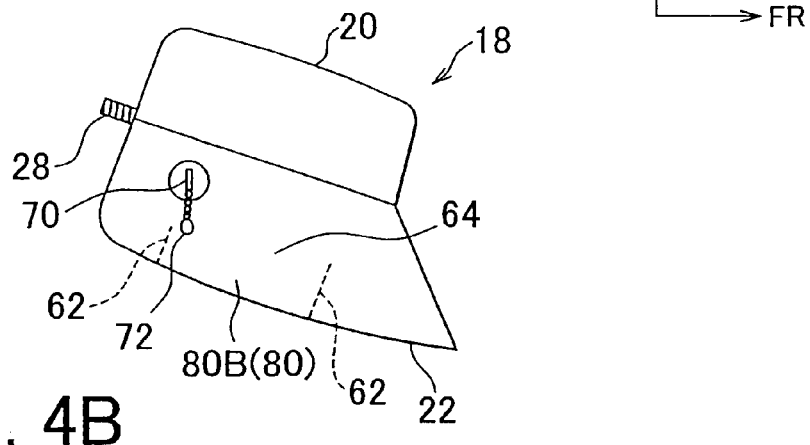
FIG. 4A shows the right surface of a column cover according to a first modified example.
Figure 4B:
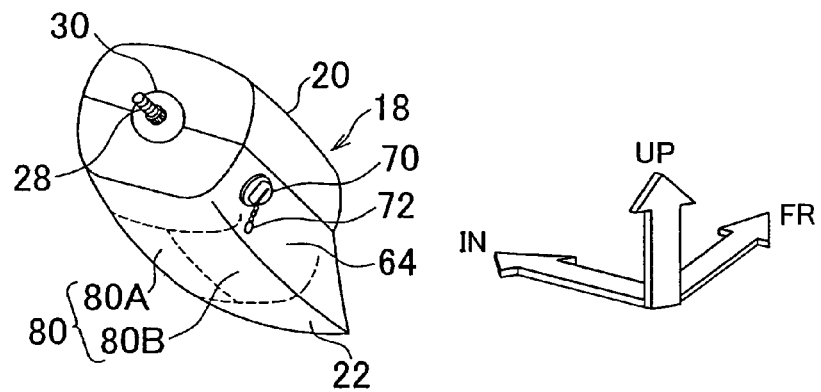
FIG. 4B is a perspective view showing the column cover according to the first modified example when an airbag door is not opened.
Figure 4C:
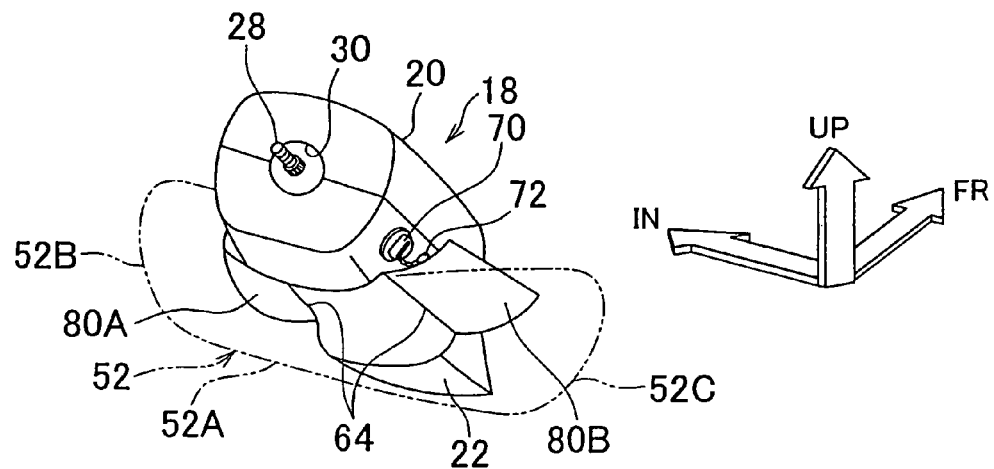
FIG. 4C is a perspective view showing the column cover according to the first modified example when the airbag door is opened.

In a first modified example shown in FIG. 4A to FIG. 4C, an airbag door 80 is divided in a manner different from the manner in which the airbag door 60 in the above-described embodiment is divided. The airbag door 80 includes two doors (right and left doors), that is, a right door 80B and a left door 80A. The right door 80B extends in the bottom wall portion and the right side wall portion of the column lower cover 22. The left door 80A extends in the bottom wall portion and the left side wall portion of the column lower cover 22. The right door 80B and the left door 80A are widely opened rightward and leftward, respectively. In this case as well, it is possible to obtain the same advantageous effects as those obtained in the above-described embodiment.

Second Modified Example

Figure 5A:
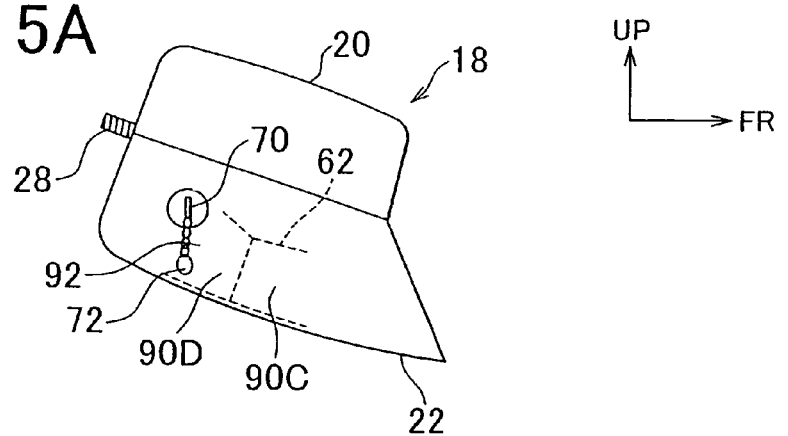
FIG. 5A shows the right surface of a column cover according to a second modified example.
Figure 5B:
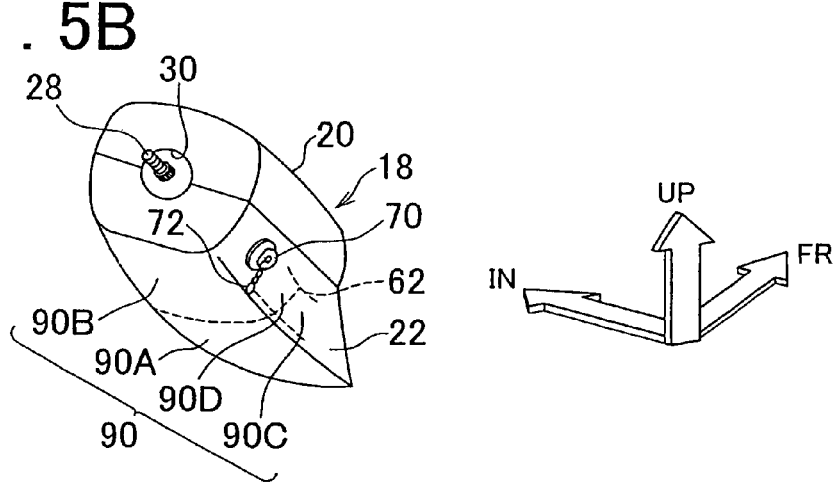
FIG. 5B is a perspective view showing the column cover according to the second modified example when an airbag door is not opened.
Figure 5C:
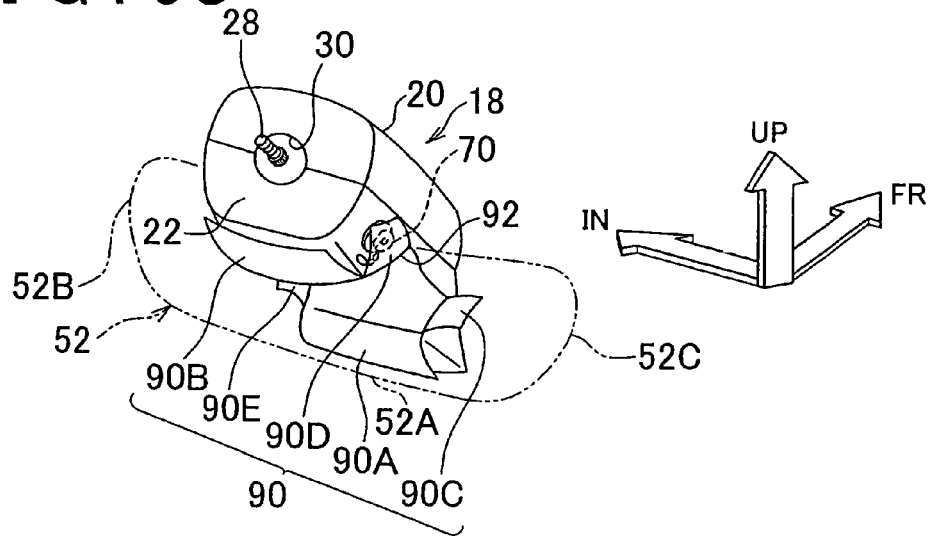
FIG. 5C is a perspective view showing the column cover according to the second modified example when the airbag door is opened.

In a second modified example shown in FIG. 5A to FIG. 5C, an airbag door 90 is divided in a manner different from the manner in which the airbag door 60 in the above-described embodiment is divided. A bottom front door 90A and a bottom rear door 90B are formed in the bottom wall portion of the column lower cover 22. A right front door 90C and a right rear door 90D are formed in the right side wall portion of the column lower cover 22, and a left front door 90E and a left rear door (not shown) are formed in the left side wall portion of the column lower cover 22. Accordingly, the airbag door 90 is divided into six portions. When the knee airbag 52 is deployed, the right rear door 90D pivots around a hinge portion 92, and covers the key accessory 72. The axis of the hinge portion 92 extends substantially in the direction of the height of the steering column 12 (i.e., a substantially vertical direction).

Third Modified Example

Figure 6A:
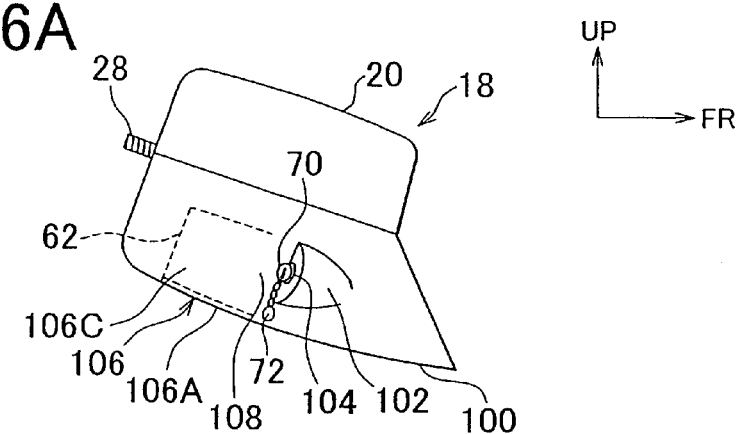
FIG. 6A shows the right surface of a column cover according to a third modified example.
Figure 6B:
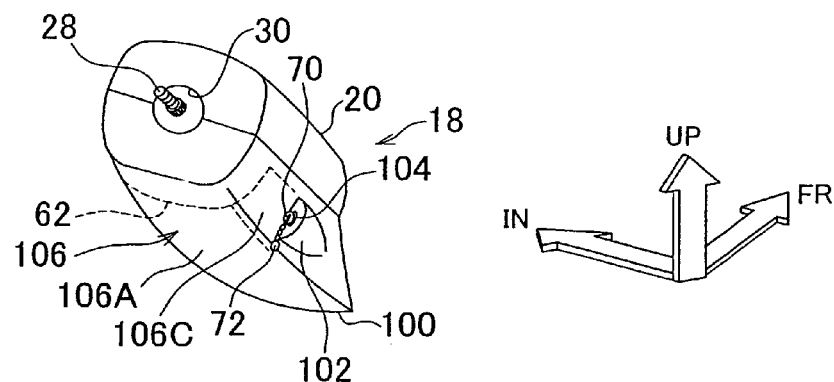
FIG. 6B is a perspective view showing the column cover according to the third modified example when an airbag door is not opened.
Figure 6C:
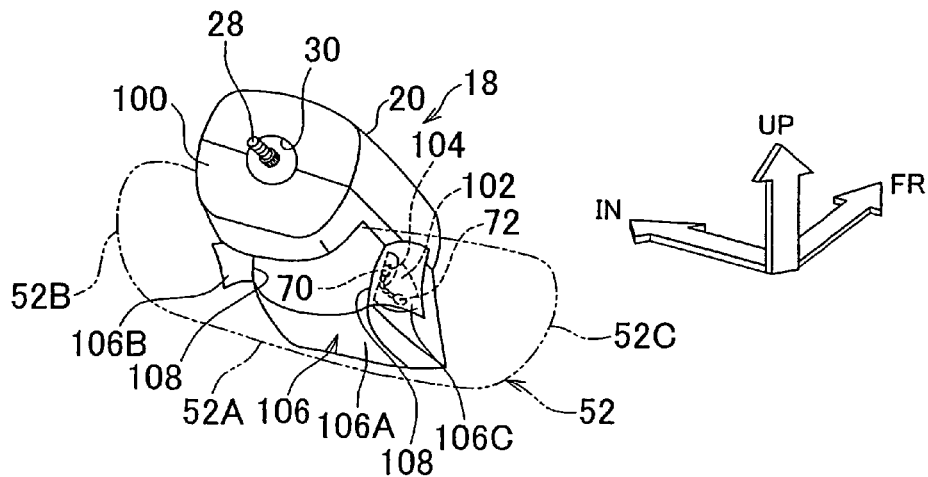
FIG. 6C is a perspective view showing the column cover according to the third modified example when the airbag door is opened.

In a third modified example shown in FIG. 6A to FIG. 6C, a projection portion 102 is provided on the right side wall portion of a column lower cover 100. The projection portion 102 with a substantially cylindrical shape projects outward in the direction of the width of the steering column 12. The projection portion 102 is formed integrally with the column lower cover 100. A key insertion portion 104, into which the key 70 is inserted, is provided in the rear end portion of the projection portion 102. An airbag door 106 formed in the column lower cover 100 is divided into three portions. A bottom door 106A is formed in the bottom wall portion of the column lower cover 100. The bottom door 106A is opened toward the front portion of the steering column 12. A right side door 106C and a left side door 106B are formed in the right and left side wall portions of the column lower cover 100. The right side door 106C and the left side door 106B pivot around hinge portions 108 toward the front portion of the steering column 12. The axes of the hinge portions 108 extend substantially in the direction of the height of the steering column 12 (i.e., the substantially vertical direction). When the knee airbag 52 is deployed, the right side door 106C covers the key accessory 72.

Supplementary Description of the Above-described Embodiment

In the above-described embodiment, when a frontal collision occurs, the knee airbag device 10 is operated. However, the invention is not limited to this configuration. A pre-crash sensor may be provided, for example, at the center of a front bumper, and the knee airbag device 10 may be also operated when the pre-crash sensor predicts that a frontal collision will occur.

In the above-described embodiment, the tilt lever 66 and the key accessory 72 are described as examples of the interfering object. However, the interfering object is not limited to the tilt lever 66 and the key accessory 72. Any object that is in the area where the right or left side portion 52C or 52B of the knee airbag 52 would be deployed if the airbag door 60 were not provided may be regarded as the interfering object.

The invention claimed is:

1. A knee airbag device comprising:
an airbag module that is provided inside a column cover that covers a rear end portion of a steering column, and that includes a gas generation device that generates gas when a collision occurs or when it is predicted that the collision will occur, and a knee airbag that is inflated and deployed from a folded state when the knee airbag receives the gas from the gas generation device; and
an airbag door that is provided in a lower portion of the column cover, and that is opened when an inflation pressure of the knee airbag is equal to or higher than a predetermined value,
wherein:
when the knee airbag is inflated and deployed, a side door of the airbag is positioned between an interfering object and at least a portion of the knee airbag, the interfering object being positioned in an area on a side of the column cover and being disposed in the path of the opening side door.

2. The knee airbag device according to claim 1, wherein:
at least the portion of the airbag door is formed in a side wall portion of the column cover;
an axis of a hinge portion of the airbag door is substantially parallel to an axis of the steering column; and
the hinge portion supports at least the portion of the airbag door when the airbag door is opened.

3. The knee airbag device according to claim 2, wherein:
the hinge portion is formed in the side wall portion of the column cover at a position below the interfering object; and
at least the portion of the airbag door pivots around the hinge portion toward a top of a vehicle.

4. The knee airbag device according to claim 2, wherein:
the airbag door includes four doors that are a bottom front door, a bottom rear door, a right side door, and a left side door; and
the bottom front door is formed in a bottom wall portion of the column cover, and opened toward a front of a vehicle, the bottom rear door is formed in the bottom wall portion, and opened toward a rear of the vehicle, and the right side door and the left side door are formed in the respective side wall portions of the column cover, and opened toward a top of the vehicle.

5. The knee airbag device according to claim 2, wherein:
the airbag door includes three doors that are a bottom door, a right side door, and a left side door; and
the bottom door is formed in a bottom wall portion of the column cover, and opened toward a front of a vehicle, and the right side door and the left side door are formed in the respective side wall portions of the column cover, and opened toward a top of the vehicle.

6. The knee airbag device according to claim 2, wherein:
the airbag door includes two doors that are a right door and a left door; and
the right door and the left door extend in a bottom wall portion and the respective side wall portions of the column cover, and the right door and the left door are opened toward a top of a vehicle.

7. The knee airbag device according to claim 1, wherein:
at least a portion of the airbag door is formed in a side wall portion of the column cover;
an axis of a hinge portion of the airbag door is substantially perpendicular to an axis of the steering column in a lateral view; and
the hinge portion supports at least the portion of the airbag door when the airbag door is opened.

8. The knee airbag device according to claim 7, wherein:
the hinge portion is formed in the side wall portion of the column cover at a position ahead of the interfering object; and
at least the portion of the airbag door pivots around the hinge portion toward a rear of a vehicle.

9. The knee airbag device according to claim 7, wherein:
the airbag door includes six doors that are a bottom front door, a bottom rear door, a right front door, a right rear door, a left front door, and a left rear door;
the bottom front door is formed in a bottom wall portion of the column cover, and opened toward a front of a vehicle, and the bottom rear door is formed in the bottom wall portion, and opened toward a rear of the vehicle; and
the right front door, the right rear door, the left front door, and the left rear door are formed in the side wall portions of the column cover, the right front door and the left front door are opened toward the front of the vehicle, and the right rear door and the left rear door are opened toward the rear of the vehicle.

10. The knee airbag device according to claim 7, wherein:
the hinge portion is formed in the side wall portion of the column cover at a position behind the interfering object; and
at least the portion of the airbag door pivots around the hinge portion toward a front of a vehicle.

11. The knee airbag device according to claim 7, wherein:
the airbag door includes three doors that are a bottom door, a right side door, and a left side door; and
the bottom door is formed in a bottom wall portion of the column cover, and opened toward a front of a vehicle, and the right side door and the left side door are formed in the respective side wall portions of the column cover, and opened toward the front of the vehicle.

12. The knee airbag device according to claim 1, wherein the interfering object includes a tilt lever or a key accessory.

13. The knee airbag device according to claim 1, wherein the airbag door is formed to extend in a bottom wall portion of the column cover, and in right and left side wall portions of the column cover.

14. The knee airbag device according to claim 1, wherein the airbag module is provided inside the column cover and below the interfering object.

15. The knee airbag device according to claim 1, wherein a tear line is formed in the column cover, and the column cover is torn along the tear line when the airbag door is opened.

* * * * *